(12) United States Patent
Zhu et al.

(10) Patent No.: US 11,112,650 B2
(45) Date of Patent: Sep. 7, 2021

(54) BACKLIGHT MODULE AND DISPLAY DEVICE

(71) Applicants: Beijing BOE Display Technology Co., Ltd., Beijing (CN); BOE TECHNOLOGY GROUP CO., LTD., Beijing (CN)

(72) Inventors: Hongli Zhu, Beijing (CN); Lili Jia, Beijing (CN); Bochang Wang, Beijing (CN); Haiwei Sun, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/961,100

(22) PCT Filed: Nov. 25, 2019

(86) PCT No.: PCT/CN2019/120682
§ 371 (c)(1),
(2) Date: Jul. 9, 2020

(87) PCT Pub. No.: WO2020/155813
PCT Pub. Date: Aug. 6, 2020

(65) Prior Publication Data
US 2021/0124216 A1     Apr. 29, 2021

(30) Foreign Application Priority Data
Feb. 2, 2019    (CN) .......................... 201910108634.1

(51) Int. Cl.
*G02F 1/13357*     (2006.01)
*G02F 1/1335*     (2006.01)

(52) U.S. Cl.
CPC .. *G02F 1/133606* (2013.01); *G02F 1/133603* (2013.01); *G02F 1/133612* (2021.01)

(58) Field of Classification Search
CPC ......... G02F 1/133606; G02F 1/133612; G02F 1/133603
See application file for complete search history.

(56) References Cited

U.S. PATENT DOCUMENTS

| 8,858,011 B2 | 10/2014 | Kim et al. |
| 9,749,819 B2 | 8/2017 | Ye et al. |

(Continued)

FOREIGN PATENT DOCUMENTS

| CN | 202171168 U | 3/2012 |
| CN | 102588828 A | 7/2012 |

(Continued)

OTHER PUBLICATIONS

First Office Action, including Search Report, for Chinese Patent Application No. 201910108634.1, dated Apr. 14, 2020, 13 pages.

(Continued)

*Primary Examiner* — Anabel Ton
(74) *Attorney, Agent, or Firm* — Westman, Champlin & Koehler, P.A.

(57) ABSTRACT

Disclosed are a backlight module and a display device. The backlight module includes a substrate; a first circuit board and a second circuit board thereon, a gap portion is between the two circuit boards; a blocking member for blocking the gap portion; and an optical sheet on a side of the blocking member facing away from the substrate, wherein the blocking member includes a blocking portion, a space is provided between the blocking portion and the optical sheet, an orthographic projection of the blocking portion on the substrate covers that of the gap portion, and wherein the blocking portion includes a first inclined surface inclined (Continued)

with respect to the first circuit board and a second inclined surface inclined with respect to the second circuit board, and the two inclined surface converge in a direction toward a light exit side to reflect light incident thereon toward the light exit side.

15 Claims, 7 Drawing Sheets

(56) References Cited

U.S. PATENT DOCUMENTS

| | | | |
|---|---|---|---|
| 10,302,856 | B2 | 5/2019 | Sun et al. |
| 10,317,604 | B2 | 6/2019 | Xie |
| 10,509,159 | B2 | 12/2019 | Lee et al. |
| 2012/0081882 | A1 | 4/2012 | Im et al. |
| 2012/0140443 | A1 | 6/2012 | Kim et al. |
| 2013/0314899 | A1 | 11/2013 | Ye et al. |
| 2014/0126240 | A1 | 5/2014 | Sun et al. |
| 2015/0211715 | A1 | 7/2015 | Song |
| 2018/0052275 | A1 | 2/2018 | Lee et al. |
| 2018/0231839 | A1* | 8/2018 | Shimizu ............ G02F 1/133603 |
| 2019/0086600 | A1 | 3/2019 | Xie |

FOREIGN PATENT DOCUMENTS

| | | |
|---|---|---|
| CN | 102853337 A | 1/2013 |
| CN | 102900999 A | 1/2013 |
| CN | 102913825 A | 2/2013 |
| CN | 103424926 A | 12/2013 |
| CN | 106873243 A | 6/2017 |
| CN | 106896584 A | 6/2017 |
| CN | 107768358 A | 3/2018 |
| CN | 108563067 A | 9/2018 |
| CN | 108881543 A | 11/2018 |
| CN | 108980695 A | 12/2018 |
| CN | 109613758 A | 4/2019 |

OTHER PUBLICATIONS

Second Office Action, including Search Report, for Chinese Patent Application No. 201910108634.1, dated Jul. 20, 2020, 15 pages.

* cited by examiner

BACKLIGHT MODULE AND DISPLAY DEVICE

CROSS-REFERENCE TO RELATED APPLICATION

The present disclosure is a Section 371 National Stage Application of International Application No. PCT/CN2019/120682, filed on Nov. 25, 2019, which claims the benefit of Chinese Patent Application No. 201910108634.1 filed on Feb. 2, 2019 in the National Intellectual Property Administration of China, the whole disclosure of which is incorporated herein by reference.

TECHNICAL FIELD

The present disclosure relate to a field of display technology, and in particular to a backlight module and a display device.

BACKGROUND

In the current mini-LED backlight, the LED chip is directly mounted on the lamp board with a higher density. Due to the limitations of the chip mounting equipment and yield, the size of the lamp board has an upper limit, which leads to a backlight source usually needs more than two lamp boards to be spliced to cover the display area of the entire display module.

However, a seam will be formed at the splicing position of the lamp boards, and a dark line or a bright line will be formed at the seam, which will affect the display quality.

SUMMARY

In order to solve at least one aspect of the above problem, the present disclosure provides a backlight module and a display device comprising the backlight module.

In one aspect, the present disclosure is directed to a backlight module, comprising: a substrate; a first circuit board and a second circuit board provided on the substrate, a gap portion is provided between the first circuit board and the second circuit board; a blocking member for blocking the gap portion; and an optical sheet on a side of the blocking member facing away from the substrate, wherein the blocking member comprises a blocking portion, a space is provided between the blocking portion and the optical sheet, an orthographic projection of the blocking portion on the substrate covers an orthographic projection of the gap portion on the substrate, and wherein the blocking portion comprises a first inclined surface inclined with respect to the first circuit board and a second inclined surface inclined with respect to the second circuit board, and the first inclined surface and the second inclined surface converge in a direction toward a light exit side to reflect light incident thereon toward the light exit side.

Optionally, the backlight module further comprises: a transparent portion provided on a side of the blocking portion facing away from the substrate, the transparent portion comprises a supporting portion on a side of the transparent portion away from the blocking portion, and the supporting portion contacts the optical sheet.

Optionally, a light diffusion structure is provided on a surface of the blocking portion facing the transparent portion.

Optionally, the light diffusion structure comprises a plurality of protrusions.

Optionally, a plurality of recesses are provided on a surface of the transparent portion facing the blocking portion, and the plurality of recesses cooperate with the plurality of protrusions, respectively.

Optionally, the transparent portion comprises a third inclined surface inclined with respect to the first circuit board and a fourth inclined surface inclined with respect to the second circuit board, and the third inclined surface and the fourth inclined surface converge in the direction toward the light exit side.

Optionally, the blocking portion comprises a first surface facing the first circuit board and the second circuit board, the first surface contacting a part of a surface of the first circuit board and the second circuit board facing the optical sheet.

Optionally, the blocking portion further comprises a second surface facing the substrate, and a connection portion provided on the second surface; and wherein a mating connection portion is formed on the substrate, the connection portion and the mating connection portion cooperate to connect the blocking member to the substrate.

Optionally, the blocking portion further comprises a second surface facing the substrate, and the backlight module further comprises an adhesive layer arranged between the second surface and the substrate.

Optionally, in a direction perpendicular to a surface of the substrate facing the first circuit board, a distance between the first surface and the supporting portion is equal to a distance between the first circuit board and the optical sheet.

Optionally, in a direction perpendicular to a surface of the substrate facing the first circuit board, a distance between the first surface and the surface of the substrate facing the first circuit board is equal to a thickness of the first circuit board.

Optionally, the backlight module further comprises an adhesive layer arranged between the first surface and the first circuit board and/or arranged between the first surface and the second circuit board.

Optionally, the blocking portion comprises a white material.

Optionally, the blocking member comprises the blocking portion and the transparent portion formed as an integral structure.

Optionally, the backlight module further comprises a plurality of first light sources provided on the first circuit board; and a plurality of second light sources provided on the second circuit board, wherein each of the plurality of first light sources and the plurality of second light sources is a mini-LED.

Optionally, the optical sheet comprises a diffusion plate.

In yet another aspect, the present disclosure is directed to a display device comprising the backlight module according to any one of the above.

In the above backlight module and display device, by providing a blocking member for blocking the gap portion at the gap portion between the circuit boards, it is possible to avoid the formation of bright lines or dark lines at the gap portion, thereby improving the display image quality.

BRIEF DESCRIPTION OF THE DRAWINGS

Through the following description of the present disclosure with reference to the accompanying drawings, other objects and advantages of the present disclosure will be apparent and may help a comprehensive understanding of the present disclosure.

Figure 1:
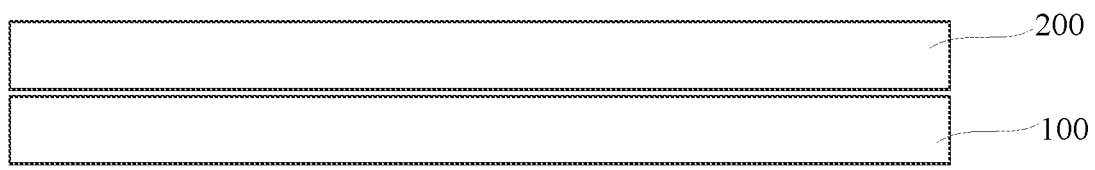
FIG. 1 is a schematic structural view of a display device with a direct type backlight module.

It should be noted that, for the sake of clarity, in the drawings used to describe the embodiments of the present disclosure, the size of layers, structures, or regions may be enlarged or reduced, that is, these drawings are not drawn according to actual scale.

DETAILED DESCRIPTION OF EMBODIMENTS

The technical solutions of the present disclosure will be further specifically described below through the embodiments and the accompanying drawings. In the description, the same or similar reference numerals indicate the same or similar components. The following description of the embodiments of the present disclosure with reference to the drawings is intended to explain the general inventive concept of the present disclosure, and should not be construed as a limitation of the present disclosure.

In addition, in the following detailed description, for convenience of explanation, many specific details are set forth to provide a comprehensive understanding of the embodiments of the present disclosure. Obviously, however, one or more embodiments can be implemented without these specific details.

It should be noted that the terms "on", "formed on", and "arranged on" described herein may mean that one layer is directly formed or placed on another layer, or one layer is indirectly formed or arranged on another layer, that is, there are other layers between the two layers.

For ease of description, spatial relationship terms, such as "upper", "lower", "left", "right", "front", "back", etc., can be used here to describe the relationship between one element or feature and another element or feature as shown in the figure. It should be understood that the spatial relationship terminology is intended to cover different orientations of the device in use or operation in addition to the orientation described in the figures. For example, if the device in the figures is turned over, elements described as "below" or "under" other elements or features would then be oriented "above" or "on" the other elements or features.

Although the terms "first", "second", etc. may be used herein to describe various components, members, elements, regions, layers and/or parts, these components, members, elements, regions, layers and/or parts are not limited by these terms. Rather, these terms are used to distinguish one component, member, element, region, layer, and/or part from another. Thus, for example, the first component, first member, first element, first region, first layer, and/or first part discussed below may be referred to as a second component, second member, second element, second region, the second layer and/or the second part without departing from the teachings of the present disclosure.

In this disclosure, "mini light-emitting diode (also called mini-LED, sub-millimeter light-emitting diode)" can refer to a light-emitting diode with a size between 100 µm and 300 µm, or about 100 µm, whose size is between traditional LED and micro-LED.

In this context, the expression "transparent portion" includes parts or portions formed of a transparent material.

The expression "integral structure" refers to a structure that can be formed by an integral molding process (such as injection molding, integral casting process, integral 3D printing process, etc.).

Since the liquid crystal display device itself does not emit light, the light source provided by the backlight module is required to display images normally. Therefore, the backlight module becomes one of the main components of the liquid crystal display device. The backlight module is divided into two types: an edge type backlight module and a direct type backlight module according to different incident positions of the light source. As shown in FIG. 1, a schematic structural view of a liquid crystal display device having a direct type backlight module is shown. The liquid crystal display device may include a backlight module 100 and a liquid crystal display panel 200. In the direct type backlight module, for example, a cathode fluorescent lamp (referred to as CCFL) or a light-emitting diode (referred to as LED) backlight is arranged behind the liquid crystal display panel, that is, on a light entrance side of the liquid crystal display panel, the light is homogenized by a diffuser and the like to form a surface light source and provided to the liquid crystal display panel.

Figure 2:
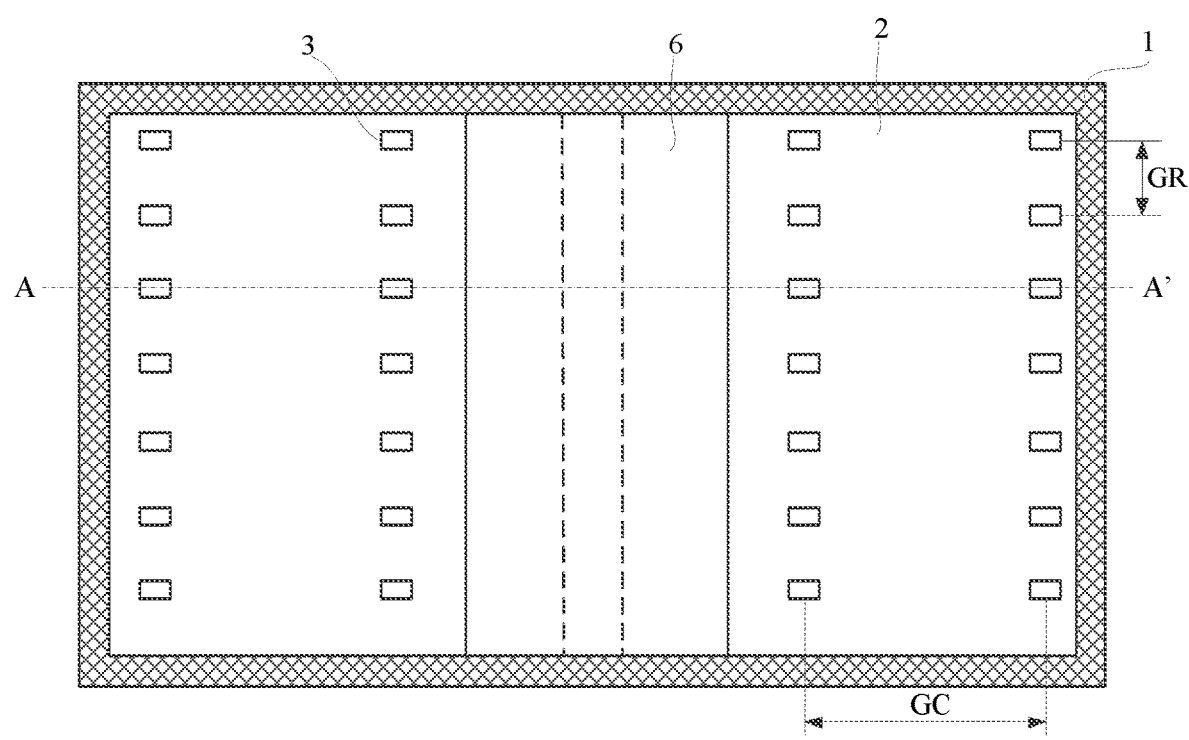
FIG. 2 is a top view of a backlight module according to an embodiment of the present disclosure.
Figure 3:
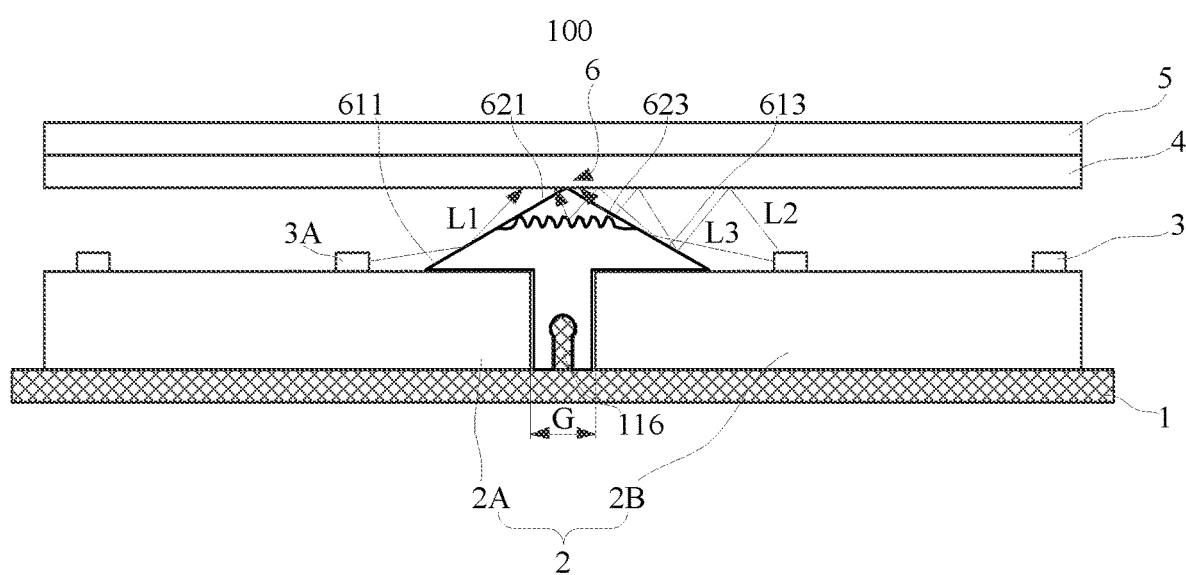
FIG. 3 is a cross-sectional view of a backlight module according to an embodiment of the present disclosure taken along line AA' in FIG. 2.

FIG. 2 shows a top view of a backlight module according to an embodiment of the present disclosure, and FIG. 3 shows a cross-sectional view of the backlight module according to an embodiment of the present disclosure taken along line AA' in FIG. 2. As shown in FIGS. 2 and 3, the backlight module 100 may include a substrate 1 and a circuit board 2 arranged on the substrate 1. For example, the substrate 1 may be a backplane of a backlight module, and the circuit board 2 may be a lamp board for carrying a light source, such as PCB, FCP and the like.

For example, the backlight module 100 may include multiple circuit boards 2 arranged side by side on the substrate 1. In the illustrated embodiment, the backlight module 100 is shown to include two circuit boards. For convenience of description, the two circuit boards are labeled as circuit board 2A and circuit board 2B, respectively. It should be understood that the number of circuit boards in the figure is only exemplary, and in other embodiments of the present disclosure, the backlight module 100 may include a larger number of circuit boards. Subject to factors such as chip mounting equipment and yield, the size of each circuit board has an upper limit, for example, the length of each circuit board may be less than 300 mm. Advantageously, the backlight module 100 including a plurality of circuit boards 2 can be applied to a large-sized display device.

The backlight module 100 may further include a plurality of light sources 3 arranged on the circuit board 2. For example, the light source may be an LED. In the illustrated embodiment, the light source 3 is a mini-LED (mini light-emitting diode). As shown in FIGS. 2 and 3, each circuit board 2 is provided with a plurality of light sources (e.g., mini-LED) 3. As shown in FIG. 2, a plurality of light sources 3 are arranged on the circuit board 2 in an array, and the plurality of light sources 3 are arranged on the circuit board 2 in rows and columns. The distance between two adjacent rows of light sources 3 is the row spacing GR, the distance between two adjacent columns of light sources 3 is the column spacing GC. In this structure, each mini-LED 3 can be regarded as a point light source, and the backlight module according to an embodiment of the present disclosure includes a plurality of mini-LEDs 3 arranged in an array to form an LED surface light source. In this way, the backlight module 100 can be a mini-LED backlight module. In the mini-LED backlight module, a high dynamic range (HDR) display effect can be achieved through local dimming design, which presents a more detailed display quality. And by using the mini-LED backlight module, the display device can be made thinner and lighter.

As shown in FIG. 3, the backlight module 100 may further include an optical sheet arranged above the plurality of light sources 3, for example, the optical sheet includes a diffusion plate 4 and an optical film layer 5 arranged on the diffusion plate 4. The diffusion plate 4 and the optical film layer 5 are arranged on the light exit side of the plurality of light sources 3, and are used to affect the light emitted by the plurality of light sources 3. For example, the diffusion plate 4 is used to diffuse the light emitted from the plurality of light sources 3. The optical film layer 5 may include a fluorescent powder layer or a quantum dot layer and is used for converting the color of light emitted from the plurality of light sources 3. Exemplarily, the light source 3 may be a mini-LED that emits blue light, and the optical film layer 5 may include red quantum dots that emit red light when excited by blue light and green quantum dots that emit green light when excited by blue light. The optical film layer 5 can convert the blue light emitted by the light source 3 into red light and green light. During the conversion process, the light can be further diffused. In this way, the blue light, red light, and green light are mixed, so that the backlight module 100 emits uniform white light. For example, in the light exit direction, that is, in a direction perpendicular to the surface of the substrate 1 facing the circuit board 2, the diffusion plate 4 is separated from the plurality of light sources 3 by a predetermined distance, which is called a light mixing distance, so as to mix the light emitted by the light source 3.

The applicant found that during the manufacturing process of the backlight module 100, a plurality of circuit boards 2 are placed on the substrate 1 one by one for splicing, and a seam will be formed at the splicing place, as shown in FIGS. 2 and 3. A gap portion G is formed between the first circuit board 2A and the second circuit board 2B. The gap portion G may cause a bright line or a dark line to be formed at the gap portion G, which may adversely affect the display image quality. For example, when the light sources (such as LEDs) on both sides of the seam are relatively close, the light emitted by the two light sources will overlap at the seam, resulting in the seam being brighter than the other parts, thus forming a bright line; when the light sources on both sides of the seam are far away from each other, the light emitted by the two light sources is insufficient at the seam, resulting in the seam being darker than the other parts, thus forming a dark line at the seam.

Figure 4:
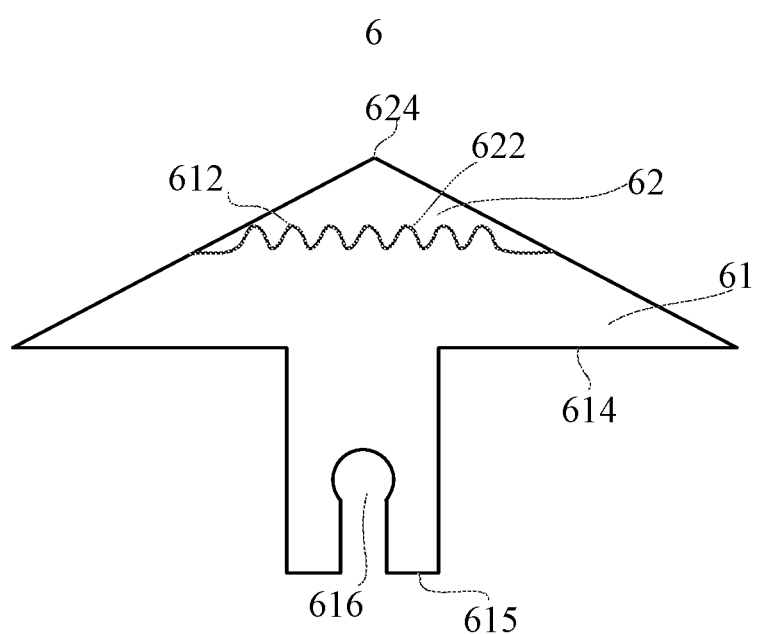
FIG. 4 is a schematic structural view of a blocking member according to an embodiment of the present disclosure.

The backlight module 100 according to the embodiment of the present disclosure may further include a blocking member 6 for blocking the gap portion G. For example, the blocking member 6 may be in the form of a blocking strip. For example, as shown in FIG. 2, the blocking member 6 extends in the up-down direction in the top view shown in FIG. 2, thereby being in the form of a blocking strip. FIG. 4 shows a schematic structural view of a blocking member according to an embodiment of the present disclosure. As shown in FIGS. 3 and 4, the blocking member 6 may include a blocking portion 61 and a transparent portion 62 provided on a side of the blocking portion 61 away from the substrate 1. An orthographic projection of the blocking portion 61 on the substrate 1 covers an orthographic projection of the gap portion G on the substrate 1. The transparent portion 62 may be made of a transparent material such as Polymethyl methacrylate (PMMA). Since the orthographic projection of the blocking portion 61 on the substrate 1 covers the orthographic projection of the gap portion G on the substrate 1, the blocking portion 61 can block the gap portion G. The applicant found that if the blocking portion does not cover the seam, the light reflected by the uncovered seam will be different from the light reflected elsewhere, resulting in that the luminescence of the uncovered seam is different from that of other places, and it usually appears that a shadow will be produced at the uncovered seams.

In this embodiment, a transparent portion 62 may also be provided, as shown in FIGS. 3 and 4, the transparent portion 62 may further include a supporting portion 624 on a side of the transparent portion 62 away from the blocking portion 61, the supporting portion 624 contacting and supporting the diffusion plate 4. Specifically, in a direction (i.e., the up-down direction shown in FIG. 3) perpendicular to the surface of the substrate 1 facing the first circuit board 2 (i.e., the upper surface of the substrate 1 shown in FIG. 3), the distance between the first surface 614 of the blocking portion 61 facing the first circuit board 2A and the second circuit board 2B and the surface of the supporting portion 624 facing the diffusion plate 4 is equal to the distance between the diffusion plate 4 and the circuit board 2, that is, equal to the distance between the surface of the first circuit board 2A facing the diffusion plate 4 and the surface of the diffusion plate 4 facing the first circuit board 2A. Through this design, the diffusion plate can be better supported. Moreover, the light mixing distance is determined by the thickness of the blocking member 6, so by designing the thickness of the blocking member 6 itself, the required light mixing distance can be achieved, which is beneficial to achieving the required light mixing distance. Moreover, since the transparent portion is provided, it is possible to avoid the formation of a dark shadow at the blocking member. In this way, by providing a blocking member for blocking the gap portion G at the gap portion G, it is possible to avoid the formation of bright lines or dark lines at the gap portion G, thereby improving the display image quality. Illustratively, the optical paths L1, L2, and L3 are shown in FIG. 3. For example, the light L1 emitted from the light source 3 may be incident on the surface of the blocking portion 61, and after being reflected by the surface of the blocking portion 61, the light L1 is deflected toward the position where the gap portion G is located and emitted toward the light exit side. For another example, the light L2 emitted from the light source 3 may enter the diffusion plate 4. It should be noted that in practical applications, light will not be transmitted through the diffuser plate 100%, and part of the light may be reflected back by the diffuser plate 4, which is indicated by the light path L2. The light L2 incident on the diffusion plate 4 is reflected back by the diffusion plate 4, and enters the surface of the blocking portion 61, reflects on the surface of the blocking portion 61 and then enters the diffusion plate 4, and reflects on the diffusion plate 4 and enters the transparent portion 62. Since the transparent portion 62 is transparent, the light L2 can pass through the transparent portion 62 and enter the interface of the blocking portion 61 and the transparent portion 62, and then exit toward the light exit side after the optical action (e.g., reflection, scattering, etc.) of the interface. For another example, the light L3 emitted from the light source 3 may be incident on the surface of the blocking portion 61, and after being reflected by the surface of the blocking portion 61, the light L3 enters the diffusion plate 4 and is reflected by the diffusion plate 4 and enters the transparent portion 62. Since the transparent portion 62 is transparent, the light L3 can pass through the transparent portion 62 and enter the interface of the blocking portion 61 and the transparent portion 62, and then exit toward the light exit side after the optical action (e.g., reflection, scattering, etc.) of the interface. It can be seen that part of the light emitted by the light source is reflected by the blocking portion or reflected multiple times between the diffusion plate and the blocking portion, and due to the presence of the transparent portion, this part of the light can be emitted at the position corresponding to the gap portion, that is, emitted at the position of the seam, so that it is possible to avoid the formation of a dark shadow at the position corresponding to the gap portion.

It should be noted that since the top end of the blocking member 6 is set to be transparent, a part of the light emitted from the light source can be emitted from the transparent portion 62, for example, the light L2 and L3 described above can be emitted from the transparent portion 62. In particular, the light L2, L3 can substantially be emitted from the contact portion of the blocking member 6 and the diffusion plate. In comparison, if the top end of the blocking member 6 is not provided with the transparent portion 62, that is, the top end of the blocking member 6 is opaque, then the light emitted from the light source cannot be transmitted through the top portion of the blocking member and enters the interface as described above, so that no light is emitted from the top portion of the blocking member. In particular, no light can be emitted from the contacting portion of the blocking member and the diffuser plate, which results in the exit light from the contacting portion of the blocking member and the diffuser plate is far less than the light emitted from other parts of the diffusion plate, thereby forming a shadow at the contact portion of the blocking member and the diffusion plate. It should be understood that although FIG. 4 shows that the top end of the blocking member 6 intersects at a point, that is, the contact portion of the blocking member 6 and the diffusion plate is a line; however, in actual application, considering factors such as actual processing technology and supporting effect, the top end of the blocking member 6 may be curved or flat, that is, the contact portion of the blocking member 6 and the diffusion plate may be one surface. In this case, it is particularly advantageous to set the top end of the blocking member 6 to be transparent, so as to avoid forming shadows on the contact surface.

Alternatively, the transparent portion 62 may also be an air space, for example, there is a space between the blocking portion 61 and the diffusion plate 4. Specifically, in a direction perpendicular to the surface of the substrate facing the circuit board, there is a space between the blocking portion 61 and the diffusion plate 4, to form an air space between the blocking portion 61 and the diffusion plate 4. Similar to the transparent portion 62 described above, the air space is also particularly advantageous for avoiding the formation of shadows.

For example, an injection molding process may be used to form the blocking portion and the transparent portion, thereby forming a blocking member having an integrated structure. For example, the blocking portion 61 may be formed of a white plastic material, and the transparent portion 62 is formed of a transparent plastic material. For example, both the blocking portion 61 and the transparent portion 62 may be formed of an acrylic material, and the blocking portion 61 is formed of a white acrylic material, the transparent portion 62 is formed of a transparent acrylic material, which is beneficial to integrally forming the blocking member 6 through an injection molding process, which not only simplifies the manufacturing process, but also improves the bonding strength of the two. Moreover, since the blocking portion 61 is formed of a white material, the blocking portion 61 has a strong ability to reflect light incident on its surface, which is beneficial to the diffusion of light at the blocking portion.

As shown in FIG. 4, a light diffusion structure is provided on the side of the blocking portion 61 facing the transparent portion 62. For example, the light diffusion structure may include a plurality of protrusions 612 arranged on a surface of the blocking portion 61 facing the transparent portion 62. In some embodiments, the plurality of protrusions 612 are distributed at intervals in a direction parallel to the first surface 614 of the blocking portion 61, for example, in the horizontal direction. Correspondingly, the transparent portion 62 may include a plurality of recesses 622 on a surface of the transparent portion 62 facing the blocking portion 61, and the plurality of recesses 622 cooperate with the plurality of protrusions 612 respectively. In this way, when the light emitted from the light source 3 is incident on the protrusions 612 (for example, light L2, L3 in FIG. 3), the light can be deflected in various directions to achieve the purpose of diffusing the light, thereby making the display quality more uniform. Moreover, the cooperation of the plurality of protrusions and the plurality of recesses makes the combination of the blocking portion and the transparent portion stronger, which is beneficial to the injection molding of the two.

As shown in FIGS. 3 and 4, the blocking portion 61 may include a first surface 614 facing the first circuit board 2A and the second circuit board 2B, the first surface 614 contacts a part of the surface of first circuit board 2A and the second circuit board 2B facing away from the substrate 1 (i.e., the upper surface shown in FIG. 3). The blocking portion 61 may include a first inclined surface 611 facing the first circuit board 2A and a second inclined surface 613 facing the second circuit board 2B. For example, the first inclined surface 611 is inclined with respect to the first circuit board 2A, and the second inclined surface 613 is inclined with respect to the second circuit board 2B, and the first inclined surface 611 and the second inclined surface 613 converge in a direction toward the light exit side (the upper side shown in FIG. 3). That is, the first inclined surface 611 and the second inclined surface 613 are close to each other in the direction toward the light exit side (the upper side shown in FIG. 3) to reflect the light incident thereon toward the light exit side. As shown in FIG. 3, part of the light L1, L2, and L3 emitted from the light source 3A may be emitted toward the light exit side at the position where the gap portion is located. With such an arrangement, it can be ensured that the light emitted toward the light exit side also exists at the position where the gap portion is located, so that the formation of dark lines can be avoided. It should be noted that the blocking portion 61 is formed of a white material, which is favorable for forming a surface for reflecting light, and can ensure that more light is emitted toward the light exit side at the position where the gap portion is located.

Alternatively, the transparent portion 62 may include a third inclined surface 621 facing the first circuit board 2A and a fourth inclined surface 623 facing the second circuit board 2B, For example, the third inclined surface 621 is inclined with respect to the first circuit board 2A, the fourth inclined surface 623 is inclined with respect to the second circuit board 2B, and the third inclined surface 621 and the fourth inclined surface 623 converge in the direction toward the light exit side. That is, the third inclined surface 621 and the fourth inclined surface 623 are close to each other in the direction toward the light exit side. For example, the first inclined surface 611 and the third inclined surface 621 may be in a same plane, and the second inclined surface 613 and the fourth inclined surface 623 may be in a same plane. Thus, as shown in FIGS. 3 and 4, the blocking member 6 has an umbrella-like shape. With this arrangement, the contact portion of the transparent portion and the diffuser plate is small, which is beneficial to avoiding the formation of dark shadows. Moreover, the transparent portion and the blocking portion are of such a gathered structure, which is beneficial to the integral molding of the two.

As shown in FIGS. 3 and 4, the blocking portion 61 may further include a second surface 615 facing the substrate 1 and a connection portion formed on the second surface 615. Correspondingly, a mating connection portion is formed on the substrate 1, and the connection portion and the mating connection portion cooperate to connect the blocking member 6 to the substrate 1. In the illustrated embodiment, the connection portion is a concave portion 616, and the mating connection portion is a rivet column 116. For example, the rivet column 116 may have a spherical structure at the top thereof, and accordingly, the concave portion 616 may have a spherical concave hole. During installation, the spherical structure of the rivet column 116 is pressed into the spherical concave hole of the concave portion 616, so that the blocking member 6 is connected to the substrate 1.

As shown in FIG. 3, the circuit board 2 is sandwiched between the blocking member 6 and the substrate 1. Specifically, the first circuit board 2A and the second circuit board 2B are sandwiched between the first surface 614 of the blocking portion 61 and the upper surface of the substrate 1 (i.e., the surface of the substrate 1 close to the first circuit board and the second circuit board). For example, in a direction perpendicular to the surface of the substrate 1 facing the first circuit board 2A, the distance between the first surface 614 and the surface of the substrate 1 facing the first circuit board 2A is equal to the thickness of the first circuit board 2A. Through such a design, it can be ensured that the first circuit board and the second circuit board are sandwiched between the first surface of the blocking portion and the upper surface of the substrate, so as to achieve the purpose of fixing the circuit board. Moreover, with such a fixing manner, it is no longer necessary to provide a fixing tape between the circuit board and the substrate.

In the embodiment shown in FIG. 3, the connection portion is a concave portion and the mating connection portion is a convex rivet column. It should be understood that the embodiments of the present disclosure are not limited thereto, and the connection portion and the mating connection portion may have other structures, such as the connection portion may be a convex rivet column, and the mating connection portion may be a concave portion. In the embodiment shown in FIG. 3, the second surface 615 of the blocking portion contacts the upper surface of the substrate 1, it should be understood that the embodiments of the present disclosure are not limited thereto. In other embodiments, the second surface 615 of the blocking portion may not contact the upper surface of the substrate 1. That is, there may be a certain distance between the second surface 615 of the blocking portion and the upper surface of the substrate 1.

Figure 5:
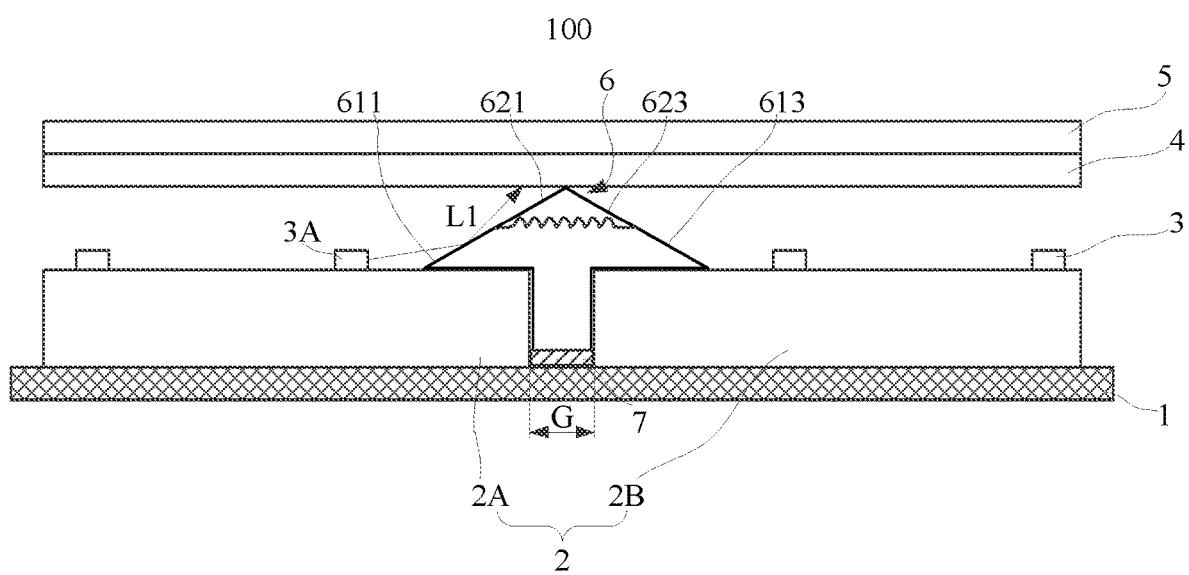
FIG. 5 is a cross-sectional view of a backlight module according to another embodiment of the present disclosure taken along line AA' in FIG. 2.

FIG. 5 shows a cross-sectional view of a backlight module according to another embodiment of the present disclosure.

In the following, the differences between the backlight module and the backlight module described above are mainly explained.

In the embodiment shown in FIG. 3, the blocking member is connected to the substrate by providing a connection portion on the blocking member and a mating connection portion on the substrate. In the embodiment shown in FIG. 5, such a connection method is not adopted. As shown in FIG. 5, the backlight module may further include an adhesive layer 7 arranged between the second surface 615 of the blocking portion 61 and the substrate 1. For example, the adhesive layer 7 may include double-sided tape to connect the blocking member 6 to the substrate 1.

Figure 6:
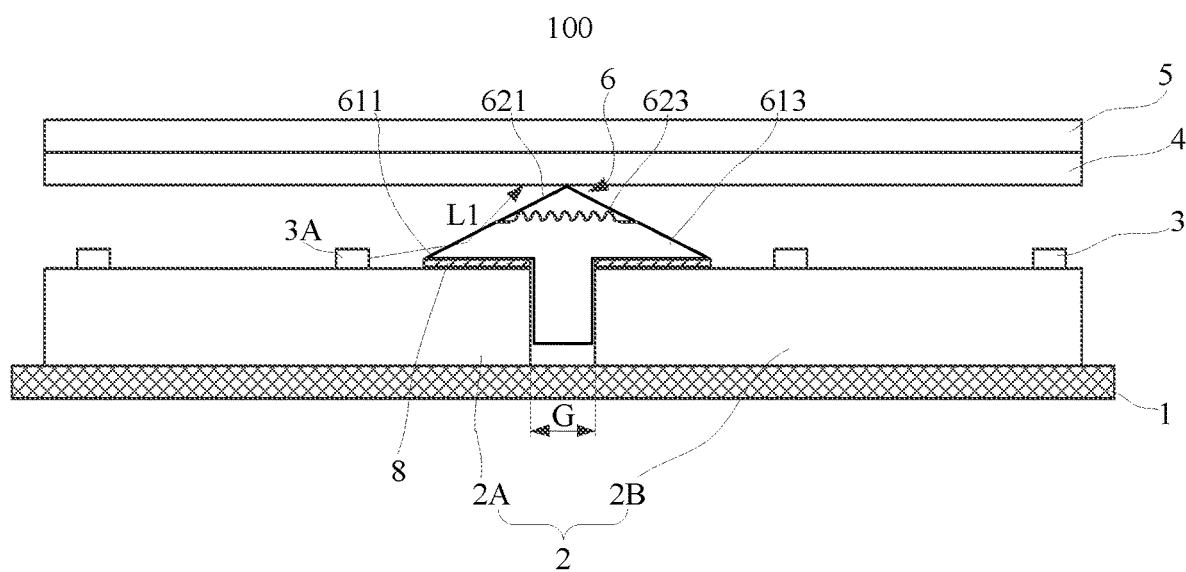
FIG. 6 is a cross-sectional view of a backlight module according to another embodiment of the present disclosure taken along line AA' in FIG. 2.

Alternatively or additionally, FIG. 6 shows a cross-sectional view of a backlight module according to another embodiment of the present disclosure. The following mainly describes the differences between the backlight module and the backlight module described above.

As shown in FIG. 6, the backlight module may further include an adhesive layer 8 arranged between the first surface 614 of the blocking portion 61 and the circuit board 2. For example, the adhesive layer 8 may include double-sided tape to connect the blocking member 6 to the circuit board 2. Since the circuit board 2 is sandwiched on the substrate 1, that is, the circuit board is fixed on the substrate 1, such a connection manner also realizes the connection between the blocking member 6 and the substrate 1. Specifically, as shown in FIG. 6, the adhesive layer 8 is provided between the first surface 614 and the upper surface of the first circuit board 2A and/or between the first surface 614 and the upper surface of the second circuit board 2B. Alternatively, there may be a gap between the second surface 615 of the blocking portion 61 and the substrate 1, that is, the second surface 615 does not contact the upper surface of the substrate 1.

Figure 7:
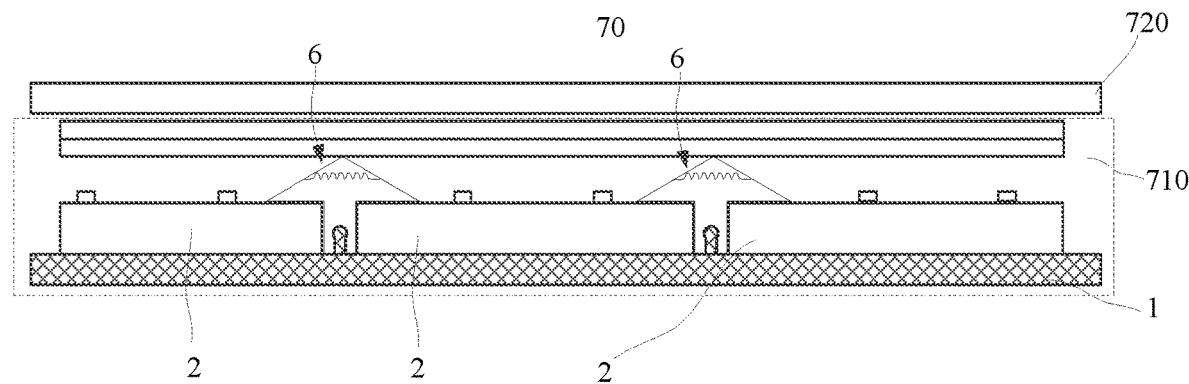
FIG. 7 is a schematic structural view of a display device according to an embodiment of the present disclosure.

FIG. 7 shows a schematic structural view of a display device according to an embodiment of the present disclosure. As shown in FIG. 7, the display device 70 may include a backlight module 710 and a display panel 720. The backlight module 710 may include a plurality of circuit boards, and between each adjacent two circuit boards, a blocking member for blocking the joint seam is provided. For example, in the illustrated embodiment, the backlight module 710 includes three circuit boards 2, and a blocking member 6 is provided in the position of a gap portion (two gap portions shown in the figure) between two adjacent circuit boards 2. For the specific structure of the backlight module 710, reference may be made to the structure of the backlight module 100 described in any of the above embodiments. The display panel 720 may be a liquid crystal display panel. For the specific structure of the liquid crystal display panel, reference may be made to the structure of the existing liquid crystal display panel, which will not be repeated here.

Although some embodiments of the present general inventive concept have been illustrated and described, those of ordinary skill in the art will understand that changes can be made to these embodiments without departing from the principles and spirit of the present general inventive concept. The scope of the present disclosure is defined by the claims and their equivalents.

What is claimed is:

1. A backlight module, comprising:
   a substrate;
   a first circuit board and a second circuit board provided on the substrate, a gap portion is provided between the first circuit board and the second circuit board;
   a blocking member for blocking the gap portion; and an optical sheet on a side of the blocking member facing away from the substrate, wherein the blocking member comprises a blocking portion, the optical sheet comprises a diffusion plate, a space is provided between the blocking portion and the optical sheet, an orthographic projection of the blocking portion on the substrate covers an orthographic projection of the gap portion on the substrate, wherein the blocking portion comprises a first inclined surface inclined with respect to the first circuit board and a second inclined surface inclined with respect to the second circuit board, and the first inclined surface and the second inclined surface converge in a direction toward a light exit side to reflect light incident thereon toward the light exit side, and wherein the backlight module further comprises: a transparent portion provided on a side of the blocking portion facing away from the substrate, the transparent portion comprises a supporting portion on a side of the transparent portion away from the blocking portion, and the supporting portion contacts the optical sheet.

2. The backlight module according to claim 1, wherein a light diffusion structure is provided on a surface of the blocking portion facing the transparent portion.

3. The backlight module according to claim 2, wherein the light diffusion structure comprises a plurality of protrusions.

4. The backlight module according to claim 3, wherein a plurality of recesses are provided on a surface of the transparent portion facing the blocking portion, and the plurality of recesses cooperate with the plurality of protrusions, respectively.

5. The backlight module according to claim 1, wherein the transparent portion comprises a third inclined surface inclined with respect to the first circuit board and a fourth inclined surface inclined with respect to the second circuit board, and the third inclined surface and the fourth inclined surface converge in the direction toward the light exit side.

6. The backlight module according to claim 1, wherein the blocking portion comprises a first surface facing the first circuit board and the second circuit board, the first surface contacting a part of a surface of the first circuit board and the second circuit board facing the optical sheet.

7. The backlight module according to claim 6, wherein the blocking portion further comprises a second surface facing the substrate, and a connection portion provided on the second surface; and wherein a mating connection portion is formed on the substrate, the connection portion and the mating connection portion cooperate to connect the blocking member to the substrate.

8. The backlight module according to claim 6, wherein the blocking portion further comprises a second surface facing the substrate, and the backlight module further comprises an adhesive layer arranged between the second surface and the substrate.

9. The backlight module according to claim 6, wherein in a direction perpendicular to a surface of the substrate facing the first circuit board, a distance between the first surface and the supporting portion is equal to a distance between the first circuit board and the optical sheet.

10. The backlight module according to claim 6, wherein in a direction perpendicular to a surface of the substrate facing the first circuit board, a distance between the first surface and the surface of the substrate facing the first circuit board is equal to a thickness of the first circuit board.

11. The backlight module according to claim 6, wherein the backlight module further comprises an adhesive layer arranged between the first surface and the first circuit board and/or arranged between the first surface and the second circuit board.

12. The backlight module according to claim 1, wherein the blocking portion comprises a white material.

13. The backlight module according to claim 1, wherein the blocking member comprises the blocking portion and the transparent portion formed as an integral structure.

14. The backlight module according to claim 1, further comprising:
a plurality of first light sources provided on the first circuit board; and
a plurality of second light sources provided on the second circuit board,
wherein each of the plurality of first light sources and the plurality of second light sources is a mini-LED.

15. A display device comprising the backlight module according to claim 1.

* * * * *